(12) United States Patent
Reinelt et al.

(10) Patent No.: US 8,083,021 B2
(45) Date of Patent: Dec. 27, 2011

(54) METHOD FOR OPERATING A STEERING SYSTEM

(75) Inventors: Wolfgang Reinelt, Stuttgart (DE); Willy Klier, Schwaebisch Gmuend (DE); Wolfgang Schuster, Abtsgmuend (DE); Reinhard Grossheim, Boebingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 1213 days.

(21) Appl. No.: 11/134,579

(22) Filed: May 19, 2005

(65) Prior Publication Data
US 2005/0279564 A1    Dec. 22, 2005

(30) Foreign Application Priority Data

Jun. 15, 2004    (DE) .......................... 10 2004 028 829

(51) Int. Cl.
B62D 5/04    (2006.01)
(52) U.S. Cl. ........................................ 180/443; 180/446
(58) Field of Classification Search .................. 180/443, 180/446
See application file for complete search history.

(56) References Cited

U.S. PATENT DOCUMENTS

| | | | |
|---|---|---|---|
| 4,726,437 A * | 2/1988 | Norton ........................... | 180/444 |
| 4,730,686 A * | 3/1988 | Shimizu ......................... | 180/446 |
| 4,956,590 A * | 9/1990 | Phillips .......................... | 318/432 |
| 4,979,114 A * | 12/1990 | Oshita et al. .................... | 701/41 |
| 5,122,958 A * | 6/1992 | Eto et al. ......................... | 701/41 |
| 6,152,254 A * | 11/2000 | Phillips .......................... | 180/422 |
| 6,256,893 B1 * | 7/2001 | Forborgen ..................... | 33/1 PT |
| 6,598,699 B2 * | 7/2003 | Takehara et al. .............. | 180/446 |
| 6,817,620 B1 * | 11/2004 | Howard ...................... | 280/89.11 |
| 7,177,745 B2 * | 2/2007 | Tsuchiya ......................... | 701/41 |
| 7,389,850 B2 * | 6/2008 | Fleck et al. .................... | 180/444 |
| 2001/0026613 A1 * | 10/2001 | Hackl et al. ............... | 379/207.02 |
| 2002/0060538 A1 * | 5/2002 | Hara et al. ..................... | 318/432 |
| 2003/0070867 A1 * | 4/2003 | Magnus ........................ | 180/446 |
| 2004/0016294 A1 * | 1/2004 | Sugitani et al. ................. | 73/146 |
| 2005/0087388 A1 * | 4/2005 | Turner et al. .................. | 180/446 |

FOREIGN PATENT DOCUMENTS

| | | |
|---|---|---|
| DE | 197 51 125 | 9/1998 |
| DE | 199 02 939 | 3/2000 |
| DE | 100 32 340 | 1/2002 |
| DE | 100 45 385 | 3/2002 |

\* cited by examiner

*Primary Examiner* — Tony H. Winner
*Assistant Examiner* — Marc Scharich
(74) *Attorney, Agent, or Firm* — Jordan and Hamburg LLP

(57) ABSTRACT

Method for operating a steering system for a motor vehicle with at least one steerable wheel, a servo drive and a superimposed gear mechanism, the steering movement, initiated by the driver of the vehicle, and the movement for producing the steering movement of the steerable wheel, initiated by the servo drive for realizing useful functions (VSR, LAFN) being superimposed by the superimposed gear mechanism into a pinion angle, the servo drive for initiating the movement being triggered by a control signal ($\delta_{Md}$) of a control device. The servo drive is turned back in a controlled manner when a substitute mode of at least one useful function (VSR, LAFN) of the steering system is switched off or on.

9 Claims, 3 Drawing Sheets

METHOD FOR OPERATING A STEERING SYSTEM

BACKGROUND OF THE INVENTION

The invention relates to a method for operating a steering system and to a computer program with programming means for carrying out such a method.

A generic method is known from DE 197 51 125 A1. For this method, the steering movements, applied by the driver by means of a steering wheel, are superimposed on the motor angle by steering wheel angles, determined by a sensor, by means of a superimposed gear mechanism with the movements of the servo drive. The thus resulting superimposed movement is passed on over the steering gear or the steering linkage to the steerable wheels for adjusting the steering angle. For this purpose, the servo drive is designed as an electric motor. The principle of functioning or the useful applications of such a power steering system consist especially therein that the steering can be carried out indirectly by the gear ratio of the superimposed gear mechanism and, with that, slight steering wheel moments can be attained. As a result, very large steering wheel angles are avoided in that suitable motor angles are superimposed, so that the necessary output angles can be adjusted with steering wheel angles of the usual magnitude. The motor angle or its nominal value, required for steering support, is determined from the steering wheel angle. Moreover, the motor angle may also depend on the signals, which represent the vehicle movements, detected by sensors and/or other vehicle systems, such as an electronic stability program (ESP). This takes place by means of a control device, on which the programs, required for determining the necessary motor angles or for the control of the useful applications can be carried out.

SUMMARY OF THE INVENTION

Because of the safety requirements, which such a steering system must meet, a safety concept with safety and diagnosis functions is indispensable, especially if for discovering random errors in the sensor system, the control device itself or the actuator system and to react suitably, that is, for example, to switch the useful functions, especially the variable steering gear ratio, suitably and/or to start appropriate substitute modes. The input signals of the control device are tested for plausibility. For example, it would be disadvantageous to accept a distorted speed signal, since the variable steering gear ratio is varied as a function of the speed.

The variable steering gear ratio of the steering system calculates the desired motor angle position on the basis of the vehicle speed, pinion angle and steering wheel angle. In the absence of the first two signals, the variable steering gear ratio may be converted into a safe but furthermore active substitute state. In the absence of the steering wheel angle signal, however, there is no information concerning the driver's steering wishes. For this situation, a meaningful substitute mode is not possible and the variable steering gear ratio must be switched off. However, since a motor angle was superimposed by the superimposed driving mechanism or the servo drive, a so-called inclined state of the steering wheel now results, that is, with the steering wheel in the straight ahead position, the steerable wheels possibly are inclined.

It is therefore an object of the present invention to provide a method for operating a steering system and a computer program for implementing the method of the type mentioned above, which, when the useful functions are switched on and off, avoids an inclined position of the steering wheel.

The input signals of the control device are monitored constantly by means of suitable safety functions and, because of this monitoring, the useful functions (such as the variable steering gear ratio) are switched on and off appropriately. By means of a controlled turning back of the servo drive, a possibly occurring steering wheel inclined position is removed reliably and almost imperceptibly for the driver when switching into a fall-back plane. By these means, the comfort of the steering system is increased substantially.

It is advantageous if steering portions for producing the control signal are superimposed by the useful functions, the steering portions for the controlled turning back of the servo drive being limited appropriately.

By these means, the individual steering portions or nominal angle defaults of all useful functions are superimposed on or added to a control signal. This may happen essentially relatively by means of specified priorities. For example, the variable steering gear ratio may have precedents as useful function and flow absolutely into the calculation, whereas the steering portions of the remaining useful functions are taken into consideration only relatively thereto. The steering portions of the useful functions for the controlled turning back of the servo drive when a substitute mode of at least one useful function is switched on or off are limited in a simple manner. This can take place separately for each steering portion, as well as for the already calculated control signal as a whole or also combined.

A substitute mode of at least one useful function can be switched off or on because of defective input signals of the control device.

A variable steering gear ratio, a lead steering or a driving dynamic stabilization come into consideration as useful functions. Moreover, other useful functions are, of course, also conceivable.

In a method development of the invention, provisions can furthermore be made said that the servo drive is turned back slowly, in a controlled manner, by means of a low angular speed and the course of the control signal for the motor angle of the servo drive is steady at the same time.

As a result, the driver hardly notices that the servo drive has been turned back. A movement of the servo drive causes a reaction moment at the steering wheel, which should be kept very small. A constant, high driving comfort accordingly is ensured.

Advantages with respect to the computer program arise similarly and are evident from the description.

An example of the invention is described in principle by means of the accompanying drawings.

DESCRIPTION OF THE PREFERRED EMBODIMENTS

An example of the invention is shown in the following, the starting point being, for example, a superimposed steering, which has already been mentioned.

Figure 1:
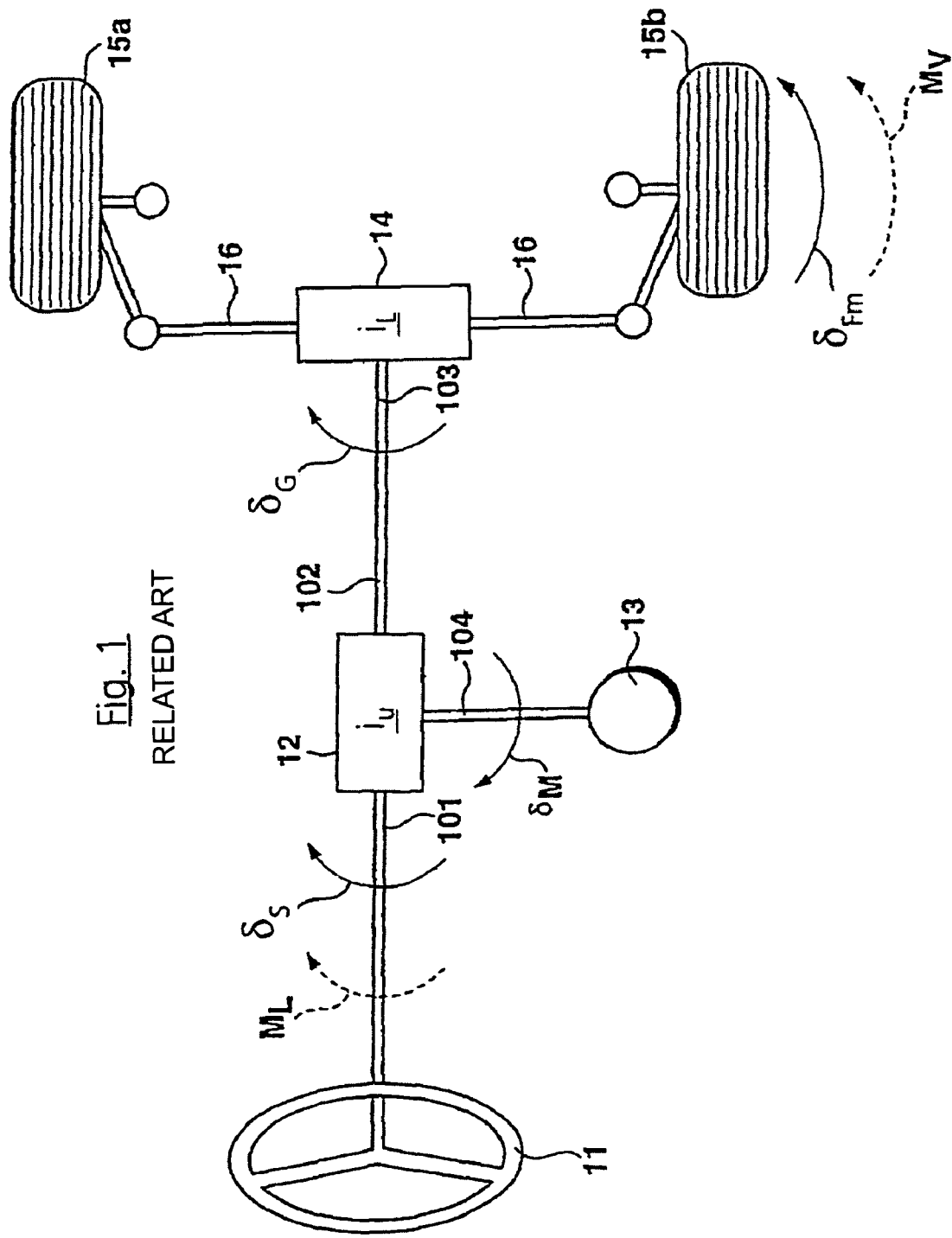
FIGS. 1 and 2 show an outline of the steering system of the state of the art, from which the inventive example starts out.
Figure 2:
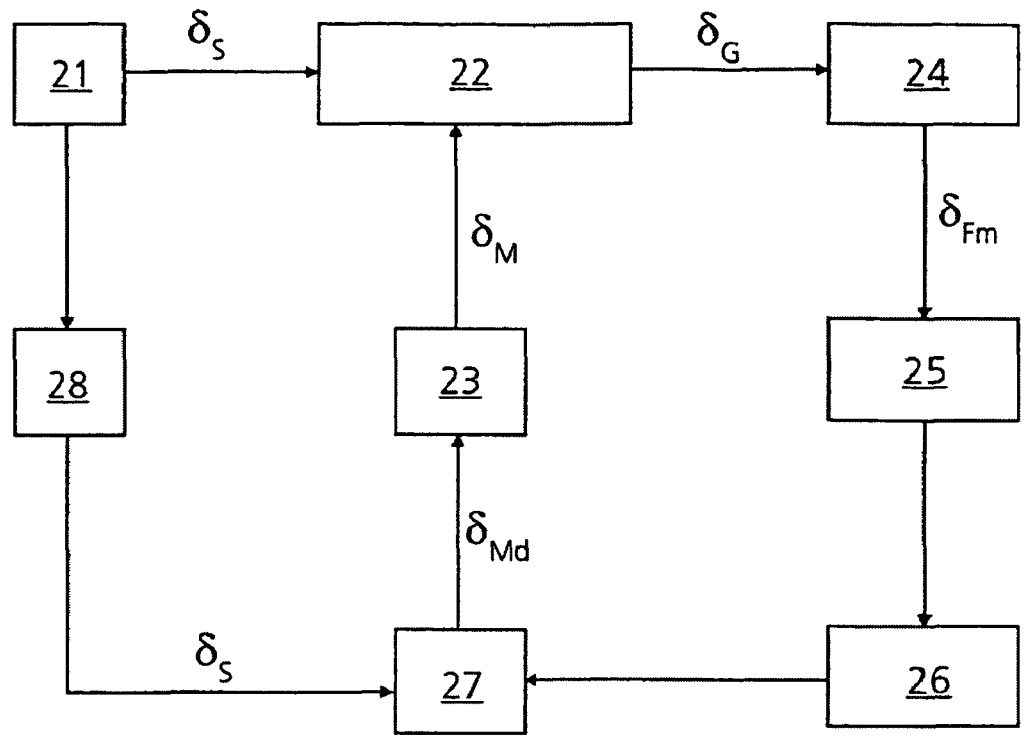

In FIGS. 1 and 2, reference numbers 11 and 21 refer to a steering wheel, which can be operated by the driver of the vehicle. By operating the steering wheel 11 or 21, a steering wheel angle $\delta_S$ is supplied over a connection 101 to a superimposed gear mechanism 12 or 22. At the same time, a motor angle $\delta_M$ of a servo drive 13 or 23 is supplied over a connection 104 to the superimposed gear mechanism 12 or 22, it being possible to construct the servo drive as an electric motor. At the output side of the superimposed gear mechanism 12 or 22, the superimposed movement or the pinion angle $\delta_G$ is supplied over a connection 102, 103 to a steering gear mechanism 14 or 24, which, in turn, acts over a steering linkage 16 in accordance with the superimposed movement or the total angle $\delta_G$ on the steerable wheels 15a and 15b. The mechanical gear ratio of the superimposed gear mechanism 12 or 22 for $\delta_M=0$, is labeled $i_{\ddot{u}}=\delta_g/\delta_S$ and the mechanical gear ratio of the steering gear 14 or 24 is labeled $i_L$.

A reaction moment $M_V$, which is affected by the street, acts on the wheels 15a and 15b, which are designed to be steered. Furthermore, sensors 26 and 28 can be seen in FIG. 2, sensor 28 detecting the steering wheel angle $\delta_S$ and supplying a control device 27, while reference number 26 marks sensors, which detect the movements of the vehicle (such as yaw movements, transverse acceleration, rpm of the wheels, vehicle speed $v_x$, etc.) and supplies corresponding signals to the control device 27. Depending on the steering wheel angle $\delta_S$, which has been determined, and optionally on the vehicle movements, the control device 27 determines a control variable $\delta_{Md}$ for triggering the servo drive 13 or 23 in order to realize useful applications (such as a variable steering gear ratio VSR). The signals of the sensors 26 can also be taken from a CAN bus system of the vehicle.

The well-known relationships between the angles and torques shown in FIGS. 1 and 2, apply. ($i_L(\ )$ is a nonlinear function):

$$i_L(\delta_{Fm}) = (\delta_S/i_{\ddot{u}} + \delta_M) \quad (1)$$

and $$M_L = M_V/(i_L \cdot i_{\ddot{u}}) \quad (2)$$

A power steering function is achieved by the steering system shown in FIGS. 1 and 2 owing to the fact that the steering wheel moment $M_L$ is reduced by a large overall gear ratio ($i_L \cdot i_{\ddot{u}}$), that is, by a very indirect steering. A motor angle $\delta_M$ is superimposed according to the above equation 1 on the steering wheel angle $\delta_S$, so that a desired front wheel angle $\delta_{Fm}$ with a steering angle $\delta_S$, which is not too large, can be set. At the same time, by suitably triggering the motor, relationships between the steering wheel angle $\delta_S$ and the steering angle $\delta_{Fm}$ can be realized, which may also depend on the driving state, such as the vehicle speed $v_x$ or the steering wheel angle $\delta_S$.

According to equation 2 above, the steering wheel moment $M_L$ depends only on the reaction moment $M_V$ at the steerable wheels and, accordingly, cannot be affected by the motor intervention. This results in the already mentioned problem that an acceptable steering wheel moment or steering sensitivity cannot be achieved for all driving situations by selecting a constant gear ratio relationship of the steering gear. In particular, the steering wheel moment $M_L$ must not be too large in the stationary state or too small when driving at high speeds.

Because of the therefrom resulting safety requirements with the respect to the steering system, a safety concept with safety and diagnosis functions, especially for detecting and appropriately reacting to random errors in sensors 26, 28, the steering device 27 itself or the actuator system, that is, for example, to switch especially the variable steering gear ratio VSR suitably, is indispensable. The input signals of the control device 27, especially $\delta_S$ and the vehicle-specific data of the sensors 26 are checked for plausibility. For example, it would be disadvantageous to accept a wrong speed signal $v_x$ of the vehicle, since the variable steering gear ratio VSR is varied as a function of the speed.

Figure 4:
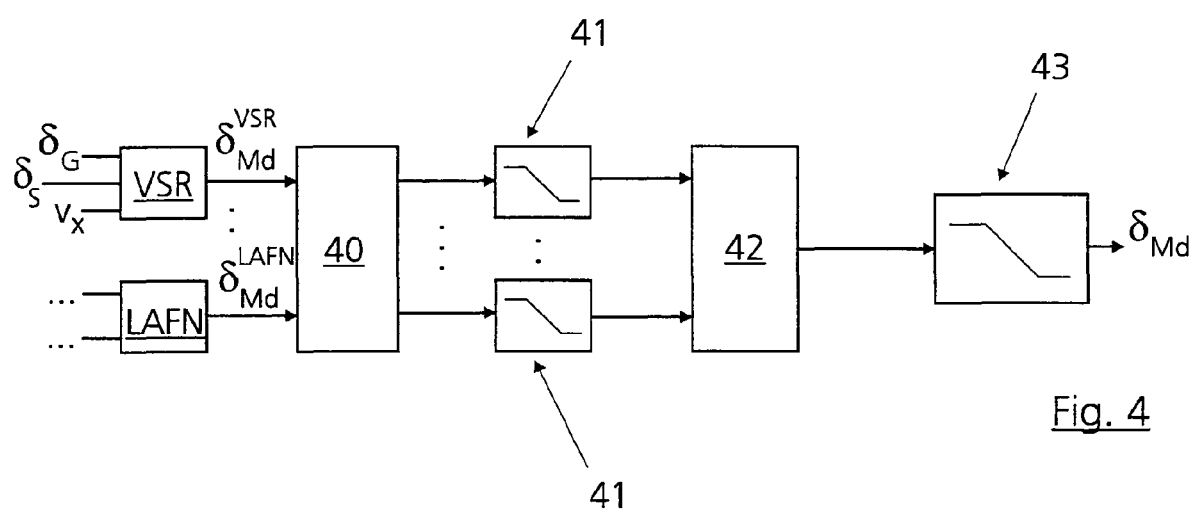
FIG. 4 shows a diagram for determining a desired motor angle within an inventive method for operating a steering system.

The variable steering gear ratio of the steering system calculates a desired motor angle default or a steering portion $\delta_{Md}^{VSR}$ on the basis of the vehicle speed $v_x$, pinion angle $\delta_G$ and steering wheel angle $\delta_S$ (refer also to FIG. 4). In the absence of the first two signals, the variable steering gear ratio VSR can be transferred into a safe, but furthermore active alternate state. In the absence of the input signal of the steering wheel angle $\delta_S$, there is also no information concerning the driver steering wishes. For this situation, a meaningful alternate mode is not possible and the variable steering gear ratio VSR must be switched off. However, since a motor angle $\delta_M$ was previously superimposed by the superimposed gear mechanism 12 or 22 or the servo drive 13 or 23, a so-called inclined state of the steering wheel now results, that is, when the steering wheel 11 or 21 is in the straight ahead position, the steerable wheels (15a, 15b) possibly are inclined.

Figure 3:
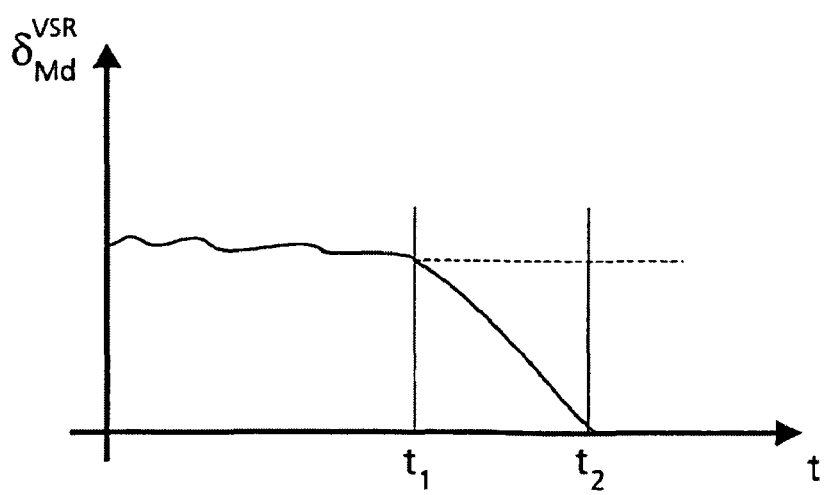
FIG. 3 shows a diagram of a course of a steering portion of a variable steering gear ratio.

Pursuant to the invention, when a correction of the inclined state of the steering wheel is necessary, as shown in FIG. 3 by means of a course of the steering portion $\delta_{Md}^{VSR}$ of the useful function, the variable steering gear ratio VSR the steering portion $\delta_{Md}^{VSR}$ is set back in a controlled manner. The steering portion $\delta_{Md}^{VSR}$ or the superimposed angle portion is plotted on the vertical axis and the horizontal axis represents the time t. Up to time $t_1$, the steering portion $\delta_{Md}^{VSR}$ proceeds normally according to the default of the variable steering gear ratio VSR. At time $t_1$, there is no input signal for the steering wheel angle $\delta_S$ of the useful function, variable steering gear ratio VSR, after which the steering portion $\delta_{Md}^{VSR}$ is driven back slowly, that is with a constant angular velocity and continuously, until, at a time $t_2$, the steering portion $\delta_{Md}^{VSR}$ is equal to zero and the inclined state of the steering wheel is eliminated. Moreover, a conceivable, constant course of the steering portion $\delta_{Md}^{VSR}$ is indicated by a broken line. The latter could be provided in the case of a failure of the input signal for the vehicle speed $v_K$ or of the pinion angle $\delta_G$.

FIG. 4 shows the determination in principle of a desired motor angle or control signal $\delta_{Md}$ within an inventive method for operating a steering system. In so doing, the variable steering gear ratio VSR and further useful functions LAFN determine steering portions $\delta_{Md}^{VSR}, \ldots, \delta_{Md}^{LAFN}$ continuously at each scanning step, for instance, by means of their input signals. These nominal default values are filtered in a pre-filtering unit 40 and then limited (corresponding to FIG. 3 between $t_1$ and $t_2$) in resetting units 41 in the event that an inclined state of the steering wheel, which is to be corrected, is present and finally superimposed or added in a coordinator 42. This superimposition takes place essentially by means of specified priorities. The variable steering gear ratio VSR, as useful function, has precedence and is entered as absolute angle in the calculation, whereas the steering portions of the remaining useful functions $\delta_{Md}^{LAFN}$ enter into the calculation only relative to the variable steering gear ratio VSR (as the respective difference between the steering portion $\delta_{Md}^{VSR}$ and the steering portions $\delta_{Md}^{LAFN}$). Finally, there is a further limitation in a unit 43, which supplies the desired motor angle default or the control signal $\delta_{Md}$ to the servo drive 13 or 23.

The inventive method of operating a steering system is preferably realized as a computer program on the control device 27. For this purpose, the computer program is stored in a memory element (not shown) of the control device 27. The inventive method is carried out by processing on a microprocessor of the control device 27. The computer program may be stored on a computer-readable storage medium (diskette, hard drive, CD-ROM, DVD, SD card, etc.) or an Internet server as computer program product and, from there, be transferred into the memory element of the control device 27.

LIST OF REFERENCE NUMBERS

11 Steering wheel
12 Superimposed gear mechanism
13 Servo drive
14 Steering gear mechanism
15a Wheels
15b Wheels
16 Steering linkage
21 Steering wheel
22 Superimposed gear mechanism
23 Sevo drive
24 Steering gear mechanism
25 -
26 Sensors
27 Control device
28 Sensors
40 Pre-filtering unit
41 Restoring unit
42 Coordinator
43 Unit
101 Connection
102 Connection
103 Connection
104 Connection
$\delta_s$ Steering wheel angle
$\delta_M$ Motor angle
$\delta_{Md}$ Nominal motor angle default or control signal
$\delta_G$ Pinion angle
$\delta_{Fm}$ Steering angle
$v_x$ Vehicle speed
$i_0$ Mechanical gear ratio of the superimposed gear mechanism
$i_L$ Mechanical gear ratio of the steering gear mechanism
$M_V$ Reaction moment
$M_L$ Steering wheel moment
$\delta_{Md}^{VSR}$ Staring portion of the variable steering gear ratio
$\delta_{Md}^{LAFN}$ Remaining steering portions
VSR Variable steering gear ratio
LAFN Further useful functions
$t_{1,2}$ Times

The invention claimed is:

1. A method for operating a steering system for a motor vehicle with at least one steerable wheel, a servo drive and a superimposed gear mechanism, comprising:
initiating a steering movement by the driver of the vehicle to create a steering wheel angle ($\delta_s$);
creating a control signal ($\delta_{Md}$) based upon useful functions (VSR, LAFN), each of said useful functions corresponding to a steering component by which the steering wheel angle ($\delta_S$) is adjusted at the superimposed gear mechanism to achieve a desired wheel angle ($\delta_{Fm}$) of the at least one steerable wheel;
triggering the servo drive for initiating movement of the servo drive creating a motor angle ($\delta_M$) by an amount indicated by the control signal ($\delta_{Md}$), said control signal being generated based upon said useful functions (VSR, LAFN);
superimposing said motor angle ($\delta_M$) on the steering wheel angle ($\delta_S$) by operation of the superimposed gear mechanism to create a pinion angle ($\delta_G$) for producing the desired wheel angle ($\delta_{Fm}$) of the at least one steerable wheel; and
turning back the servo drive in a controlled manner by at least one said steering component to eliminate an inclined position of the at least one steerable wheel when at least one of said useful functions of the steering system, corresponding to at least one said steering component for turning back the servo drive, is disabled.

2. The method of claim 1, wherein steering portions formed by the useful functions (VSR, LAFN) are superimposed for producing the control signal ($\delta_{Md}$), the steering portions ($\delta_{Md}$, $\delta_{Md}$) being limited appropriately for the turning back of the servo drive in the controlled manner.

3. The method of claim 1 or 2, wherein a control device receives the steering wheel angle ($\delta_S$), the pinion angle ($\delta_G$) and further vehicle-specific parameters as input signals, a substitute mode of said at least one of said useful functions being switched on or off because of defective input signals ($v_x$, $\delta_G$, $\delta_S$) of the control device.

4. The method of claim 3, wherein said further vehicle-specific parameters include a vehicle speed ($v_x$).

5. The method of claim 1 or 2, wherein a variable steering gear ratio (VSR), a lead steering or a vehicle dynamics stabilization is used as one of the useful functions.

6. The method of claim 1 or 2, wherein the turning back of the servo drive is performed slowly in the controlled manner by means of a low angular velocity.

7. The method of claim 1 or 2, wherein a course of the control signal ($\delta_{Md}$) for the motor angle ($\delta_M$) of the servo drive is steady for the turning back in the controlled manner.

8. A method for operating a steering system for a motor vehicle including a steering wheel, at least one steerable wheel, a servo drive and a superimposed gear mechanism, comprising:
orienting the steering wheel at a steering wheel angle ($\delta_S$);
creating a control signal ($\delta_{Md}$) based upon at least one useful function of vehicle-specific data corresponding to a steering component by which the steering wheel angle ($\delta_S$) is adjusted at the superimposed gear mechanism to achieve a desired wheel angle ($\delta_{Fm}$) of the at least one steerable wheel, said at least one useful function including a variable steering gear ratio (VSR);
turning the servo drive to a motor angle ($\delta_M$) in accordance with the control signal ($\delta_{Md}$);
superimposing said motor angle ($\delta_M$) on the steering wheel angle ($\delta_S$) by the superimposed gear mechanism to create a pinion angle ($\delta_G$) for producing a steering angle of the at least one steerable wheel ($\delta_{Fm}$); and
eliminating said motor angle ($\delta_M$) in a controlled manner by appropriate movement of the servo drive when said at least one usable function is disabled in order to prevent an inclined position of the at least one steerable wheel ($\delta_{Fm}$).

9. The method of claim 8, wherein the variable steering gear ratio (VSR) is disabled in an absence of an input signal of the steering wheel angle ($\delta_S$).

* * * * *